United States Patent
Savela et al.

(10) Patent No.: US 9,470,263 B2
(45) Date of Patent: Oct. 18, 2016

(54) SQUEEZE FILM DAMPER

(71) Applicant: United Technologies Corporation, Hartford, CT (US)

(72) Inventors: Gregory M. Savela, Amston, CT (US); Robert J. Morris, Portland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 71 days.

(21) Appl. No.: 14/626,286

(22) Filed: Feb. 19, 2015

(65) Prior Publication Data
US 2016/0245336 A1    Aug. 25, 2016

(51) Int. Cl.
*F16C 27/04*    (2006.01)
*F02C 7/06*    (2006.01)

(52) U.S. Cl.
CPC ............ *F16C 27/045* (2013.01); *F02C 7/06* (2013.01)

(58) Field of Classification Search
CPC .................................................. F16C 27/045
See application file for complete search history.

(56) References Cited

U.S. PATENT DOCUMENTS

| | | | | |
|---|---|---|---|---|
| 4,545,586 A | * | 10/1985 | von Pragenau | F16J 15/444 277/414 |
| 4,671,676 A | * | 6/1987 | Chen | F16C 17/026 384/100 |
| 4,867,655 A | * | 9/1989 | Barbic | F16C 27/045 384/535 |
| 4,927,326 A | * | 5/1990 | von Pragenau | F01D 11/025 415/170.1 |
| 5,110,257 A | * | 5/1992 | Hibner | F01D 25/164 415/119 |
| 5,228,784 A | * | 7/1993 | Bobo | F16C 27/045 384/487 |
| 5,501,531 A | * | 3/1996 | Hamaekers | F16C 27/066 384/536 |
| 6,056,441 A | * | 5/2000 | Scharrer | F16C 32/0685 384/100 |
| 2011/0064340 A1 | * | 3/2011 | Duong | F16C 27/045 384/99 |

FOREIGN PATENT DOCUMENTS

| | | |
|---|---|---|
| GB | 1284602 | 8/1972 |
| WO | 9826190 | 6/1998 |

OTHER PUBLICATIONS

Danaila, S. and Moraru, L., "On the validity of the classical hydrodynamic lubrication theory applied to Squeeze Film Dampers.", 25th IAHR Symposium on Hydraulic Machinery and Systems, IOP Conf. Series: Earth and Environmental Science 12 (2010), pp. 1-9, IOP Publishing Ltd.
Extended European Search Report dated May 3, 2016 in European Application No. 16156187.3.

* cited by examiner

*Primary Examiner* — Thomas R. Hannon
(74) *Attorney, Agent, or Firm* — Snell & Wilmer, L.L.P.

(57) ABSTRACT

A bearing for a gas turbine engine may comprise a squeeze film damper. A bearing housing may comprise a roughened surface. The roughened surface may increase friction between the bearing housing and the oil in the squeeze film damper. The increased friction may increase the damping force in the squeeze film damper. The increased damping force may prevent oil inertia, and prevent resonant vibrations.

15 Claims, 5 Drawing Sheets

SQUEEZE FILM DAMPER

FIELD

The disclosure relates generally to gas turbine engines, and more particularly to damping devices within gas turbine engine bearing compartments.

BACKGROUND

Gas turbine engines typically comprise bearings which support rotating shafts. The bearings may comprise an inner race which rotates with the shaft, and a plurality of rollers between the inner race and an outer race which does not rotate. One or more seals may contain an annulus between the outer race and a housing. Oil may be fed into the annulus. The oil may form a squeeze film damper which damps whirling of the shaft, in which the shaft deflects away from an engine centerline and precesses about the engine centerline. However, under certain conditions, the squeeze film damper may degrade in its ability to damp rotor motion, an effect known as "oil inertia." In such conditions, prior methods have involved turning the supply of oil to the squeeze film damper off with an external valve, rendering the squeeze film damper ineffective.

SUMMARY

A bearing for a shaft may comprise an inner race configured to couple to the shaft, an outer race disposed around the inner race, and a housing disposed around the outer race. The housing and the outer race may define an annulus. The housing may comprise a roughened surface.

In various embodiments, the bearing may comprise a seal between the outer race and the housing. The roughened surface may be configured to increase friction between the housing and oil within the annulus. The roughened surface may comprise a plurality of surface features. A height of the plurality of surface features may be between 10-20% of a clearance between the housing and the outer race. The plurality of surface features may be configured to increase a ratio of a damping force to a stiffness force. The plurality of surface features may comprise at least one of grooves, posts, dots, swirls, a herringbone pattern, cross-hatch, honeycomb, dimples, flaps, or teeth.

A squeeze film damper may comprise an outer race, a housing comprising a roughened surface, and a first seal and a second seal between the outer race and the housing. The housing, the outer race, the first seal and the second seal may define an annulus.

In various embodiments, the squeeze film damper may comprise an oil supply hole in the housing. The roughened surface may be configured to decrease oil inertia. The roughened surface may comprises surface features. The roughened surface may comprise a surface roughness of at least 50 $R_A$ microinches. A height of the surface features may be between 10-20% of a clearance between the housing and the outer race. The surface features may be configured to increase a ratio of a damping force to a stiffness force.

A gas turbine engine may comprise a shaft, an inner bearing race coupled to the shaft, an outer bearing race surrounding the inner bearing race, wherein the shaft and the inner bearing race are configured to rotate within the outer bearing race, and a housing surrounding the outer bearing race, wherein the outer bearing race is configured to whirl within the housing. The housing may comprise a roughened surface.

In various embodiments, the roughened surface may be configured to damp the whirling. The roughened surface may comprise surface features. The roughened surface may be configured to increase a ratio of a damping force to a stiffness force. The roughened surface may comprise a surface roughness of at least 50 $R_A$ microinches. The surface features may comprise at least one of grooves, posts, dots, swirls, a herringbone pattern, cross-hatch, honeycomb, dimples, flaps, or teeth.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
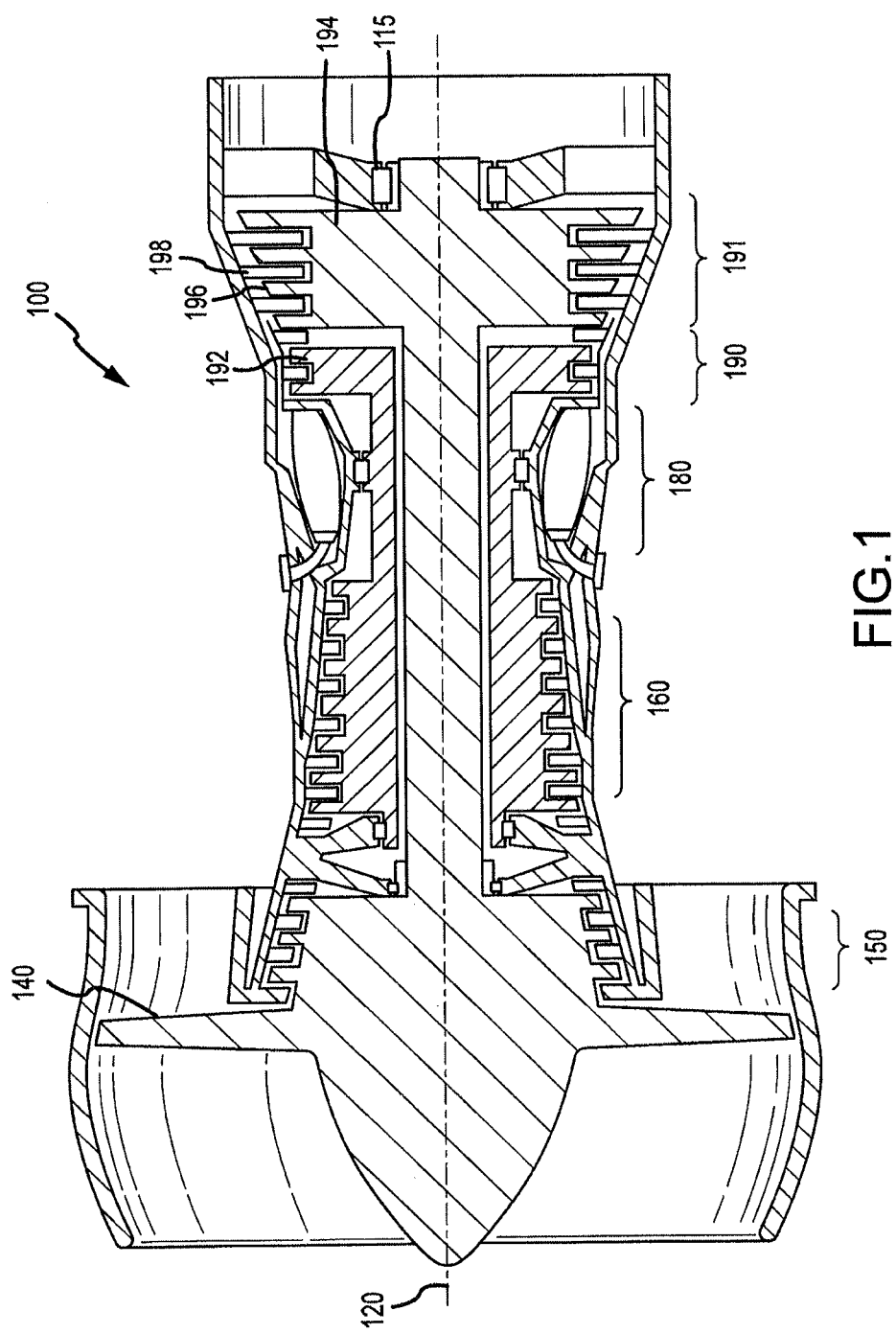
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about engine centerline 120, which may also be referred to as axis of rotation 120. Gas turbine engine 100 may comprise a fan 140, compressor sections 150 and 160, a combustion section 180 including a combustor, and turbine sections 190, 191. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the combustor and turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of rotating machinery, turbomachinery, and pumps, including turbofan gas turbine engines and turbojet engines, for all types of applications. This may also extend when used in combination with other bearing types in said applications including journal type bearings.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
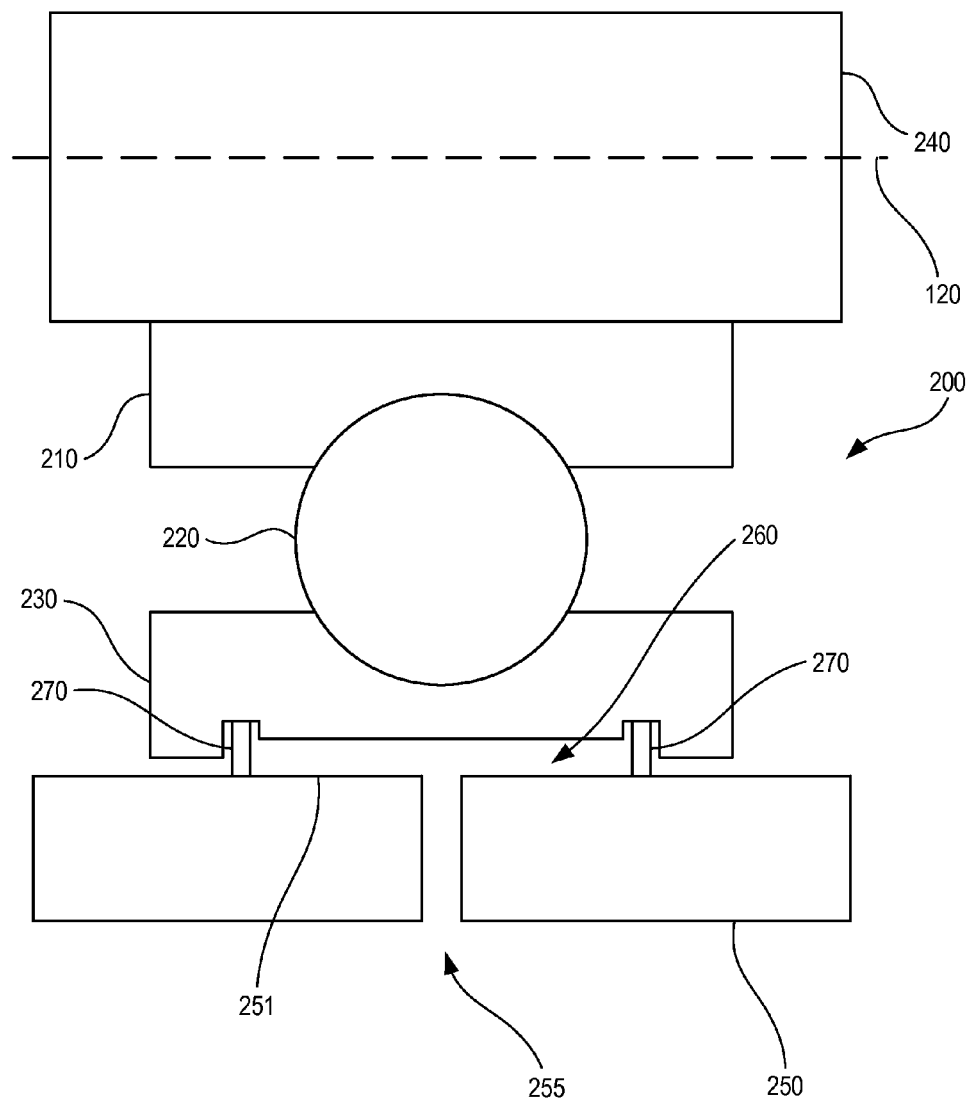
FIG. 2 illustrates a cross-section view of a bearing in accordance with various embodiments.

Referring to FIG. 2, a cross-section view of a bearing 200 is illustrated according to various embodiments. The bearing 200 may comprise an inner race 210, a roller 220, and an outer race 230. The inner race 210 may be coupled to a shaft 240 which rotates about the engine centerline 120. The inner race 210 may rotate with the shaft 240. The outer race 230 may not rotate with the inner race 210. The roller 220 may rotate and decrease friction between the inner race 210 and the outer race 230 as the inner race 210 rotates relative to the outer race 230. The bearing 200 may be located within a housing 250. The housing 250 and the outer race 230 may form an annulus 260 around the outer race 230 and between the outer race 230 and the housing 250. The housing 250 may comprise a roughened surface 251, as further described with reference to FIG. 4 and FIG. 5. The annulus 260 may be at least partially sealed by seals 270. Oil may be supplied to the annulus 260 through an oil supply hole 255 in the housing 250. The oil may absorb heat from the outer race 230. A portion of the oil, heated by the shearing of the oil in the annulus 260, may leak by the seals 270, and additional, cooler oil may be supplied to the annulus 260 through the oil supply hole 255.

Figure 3:
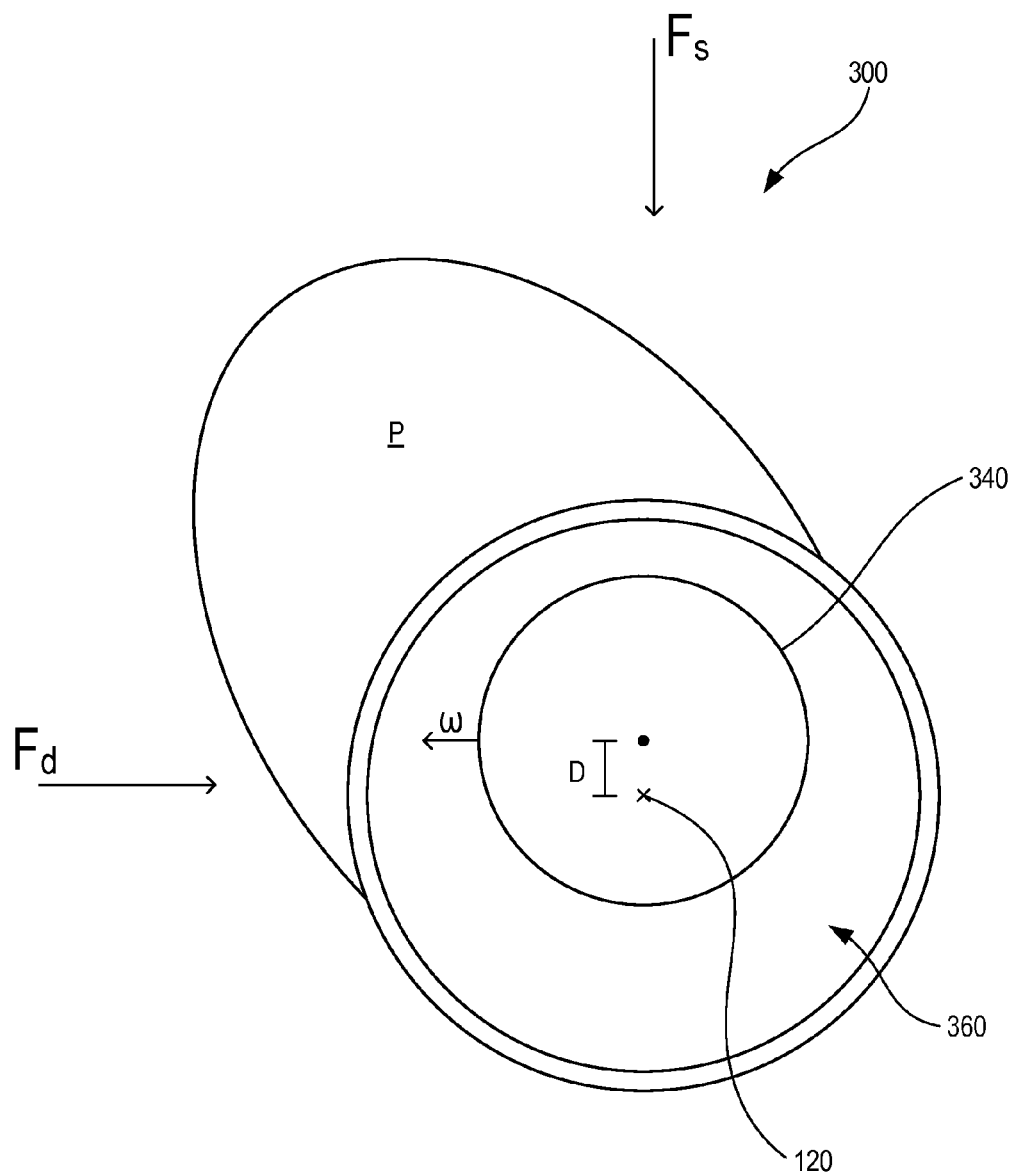
FIG. 3 illustrates a cross-section view of a bearing and damper pressure profile along the engine centerline in accordance with various embodiments.

Referring to FIG. 3, a cross-section view of a prior art bearing 300 looking along the engine centerline with the shaft whirling is illustrated according to various embodiments. The shaft assembly 340 (which may include the shaft, the inner race, the rollers, and the outer race) may be displaced from the engine centerline 120 by the displacement D. The shaft assembly 340 may whirl about the engine centerline 120 as indicated by the rotational velocity vector ω. The whirling motion may squeeze oil around the annulus 360, producing a rotating pressure wave P. The pressure wave P may comprise a stiffness force Fs along the direction of displacement D and in the opposite direction of the displacement D. The stiffness force $F_s$ may resist displacement of the shaft assembly 340. The pressure wave P may comprise a damping force $F_d$ orthogonal to the direction of displacement D and opposite to the direction of the whirl velocity vector ω. The damping force $F_d$ may thus decrease the amplitude of the whirling motion. The pressure wave P may be altered by changing parameters including the annulus diameter, the annulus length, the clearance between the outer race and the housing, and the oil viscosity.

Figure 4:
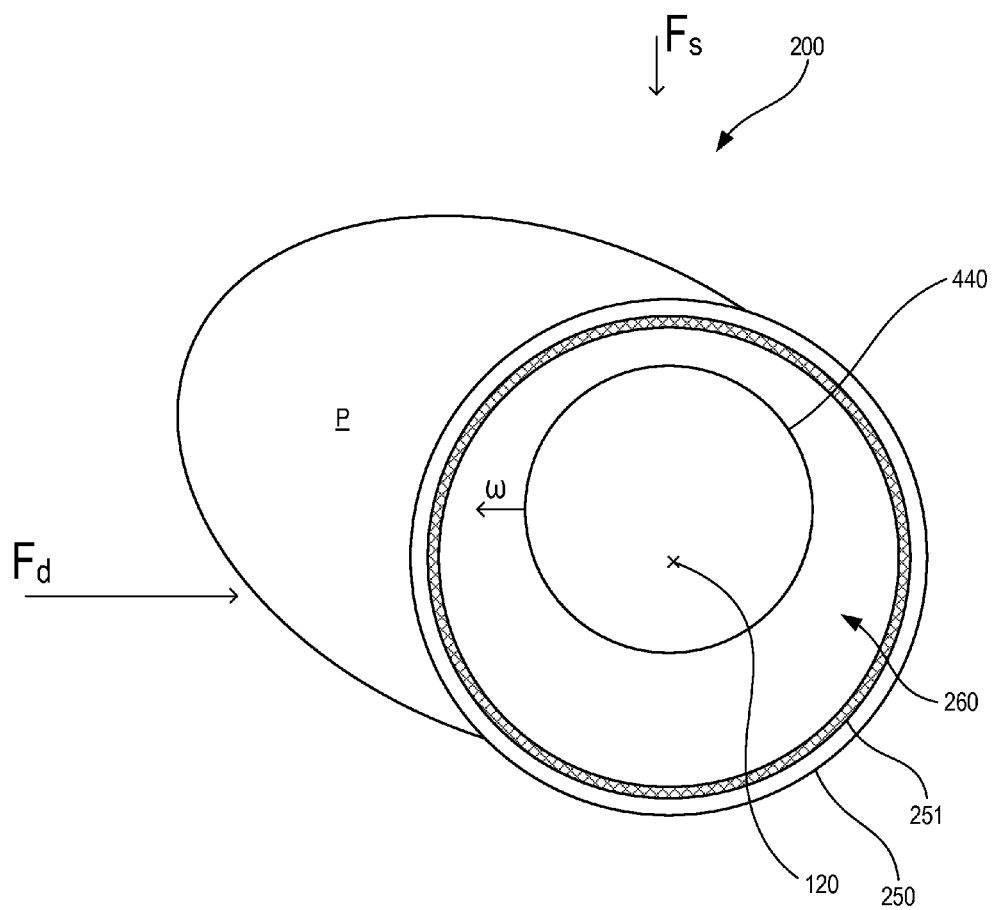
FIG. 4 illustrates a cross-section view of a bearing and damper pressure profile having a housing with a roughened surface along the engine centerline in accordance with various embodiments.

Referring to FIG. 4, a cross-section view of the bearing 200 comprising a roughened housing surface looking along the engine centerline 120 is illustrated according to various embodiments. The housing 250 may comprise a roughened surface 251. The roughened surface 251 may increase the friction between the housing 250 and the oil in the annulus 260. The increased friction may have a similar effect to increasing the viscosity of the oil and/or decreasing the Reynolds number in the bearing 200. As the shaft assembly 440 (which may include the shaft, the inner race, the rollers, and the outer race) whirls about the engine centerline 120, the shaft assembly 440 may tend to push the oil in front of the direction of whirl ω of the shaft assembly 440 around the annulus 260. The roughened surface 251 may increase resistance to the oil squeezing around the annulus 260 ahead of the direction of whirl of the shaft assembly. Thus, the roughened surface 251 may shift the pressure wave P circumferentially in the direction of whirl of the shaft assembly 440. This may increase the ratio of the damping force $F_d$ to the stiffness force $F_s$. The increased ratio may prevent the effects of oil inertia and allow the squeeze film damper to be utilized over a larger operating range of the engine.

Figure 5:
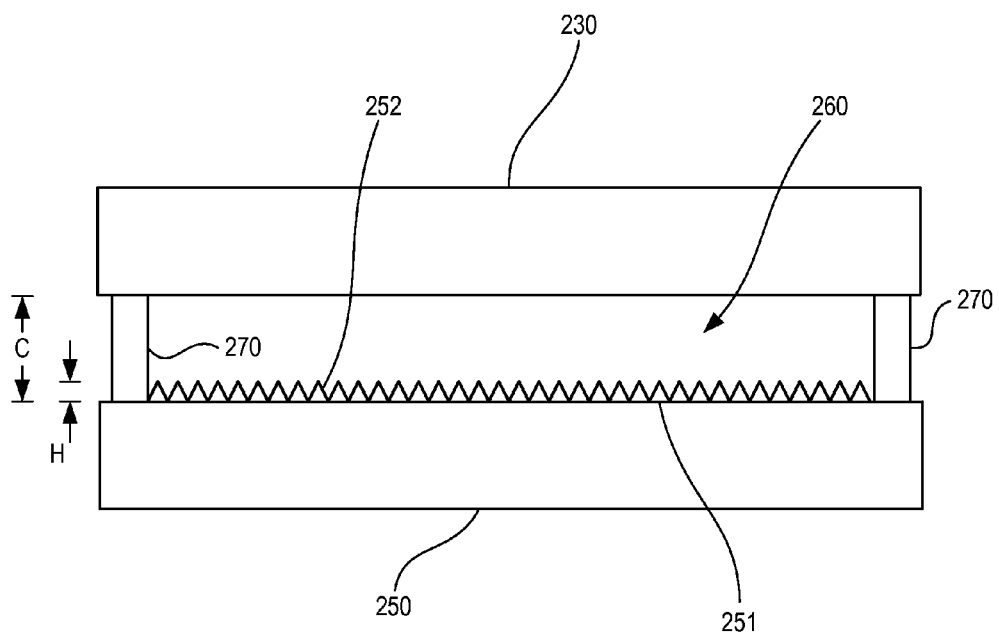
FIG. 5 illustrates a cross-section view of an annulus in accordance with various embodiments.

Referring to FIG. 5, a cross section view of the annulus 260 is illustrated according to various embodiments. The annulus 260 may be defined by the outer race 230, the housing 250, and the seals 270. The housing 250 may comprise a roughened surface 251. The roughened surface 251 may comprise surface features 252. The surface features 252 may be any shape or pattern which increases friction between the outer race 230 and oil within the annulus 260. In various embodiments, the surface features 252 may comprise at least one of grooves, posts, dots, swirls, a herringbone pattern, cross-hatch, honeycomb, dimples, flaps, teeth, etc.

The surface features 252 may comprise a height H. The height H may be expressed as a ratio of the clearance C between the outer race 230 and the housing 250. For example, in various embodiments, the height H may be 10-20%, 5-30%, or 1-50% of the clearance C. In various embodiments, the clearance C may be between 0.005 inches-0.025 inches (0.01 cm-0.06 cm). In various embodiments, the height H may be between 0.0005 inches-0.005 inches (0.001 cm-0.01 cm). In various embodiments, the roughened surface 251 may comprise a surface roughness of greater than 20 $R_A$ microinches (0.51 micrometers). In various embodiments, the roughened surface 251 may comprise a surface roughness of greater than 50 $R_A$ microinches (1.3 micrometers).

The roughened surface 251 may be formed by any process suitable to roughen the housing 250. In various embodiments, the housing 250 may be formed with the roughened surface 251. In various embodiments, the housing 250 may be formed with a smooth surface, and the roughened surface 251 may be formed by grinding, etching, carving, scraping, or otherwise removing material from the housing 250. In various embodiments, the roughened surface 251 may be formed by coupling the surface features 252 to the housing 250, such as by spraying on the surface features 252 or coupling a roughened sleeve to the housing 250.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A bearing for a shaft comprising:
a rotating inner race configured to couple to the shaft;
a non-rotating outer race disposed around the inner race; and
a non-rotating housing disposed around the outer race, wherein the housing and the outer race define an annulus, and wherein the housing comprises a roughened surface comprising a plurality of surface features, the plurality of surface features having a height of between 10-20% of a clearance between the housing and the outer race.

2. The bearing of claim 1, further comprising a seal between the outer race and the housing.

3. The bearing of claim 1, wherein the roughened surface is configured to increase friction between the housing and oil within the annulus.

4. The bearing of claim 1, wherein the plurality of surface features are configured to increase a ratio of a damping force to a stiffness force.

5. The bearing of claim 1, wherein the plurality of surface features comprise at least one of grooves, posts, dots, swirls, a herringbone pattern, cross-hatch, honeycomb, dimples, flaps, or teeth.

6. A squeeze film damper comprising:
a non-rotating outer race;
a non-rotating housing comprising a roughened surface comprising a plurality of surface features, the plurality of surface features having a height of between 10-20% of a clearance between the housing and the outer race; and
a first seal and a second seal between the outer race and the housing; wherein the housing, the outer race, the first seal and the second seal define an annulus.

7. The squeeze film damper of claim 6, further comprising an oil supply hole in the housing.

8. The squeeze film damper of claim 6, wherein the roughened surface is configured to decrease oil inertia.

9. The squeeze film damper of claim 6, wherein the roughened surface comprises a surface roughness of at least 50 RA microinches.

10. The squeeze film damper of claim 6, wherein the surface features are configured to increase a ratio of a damping force to a stiffness force.

11. A gas turbine engine comprising:
a shaft;
an inner bearing race coupled to the shaft;
a non-rotating outer bearing race surrounding the inner bearing race, wherein the shaft and the inner bearing race are configured to rotate within the outer bearing race; and
a non-rotating housing surrounding the outer bearing race, wherein the outer bearing race is configured to whirl within the housing;
wherein the housing comprises a roughened surface comprising a plurality of surface features, the plurality of surface features having a height of between 10-20% of a clearance between the housing and the outer bearing race.

12. The gas turbine engine of claim 11, wherein the roughened surface is configured to damp the whirling.

13. The gas turbine engine of claim 11, wherein the roughened surface is configured to increase a ratio of a damping force to a stiffness force.

14. The gas turbine engine of claim 11, wherein the roughened surface comprises a surface roughness of at least 50 RA microinches.

15. The gas turbine engine of claim 11, wherein the surface features comprise at least one of grooves, posts, dots, swirls, a herringbone pattern, cross-hatch, honeycomb, dimples, flaps, or teeth.

* * * * *